United States Patent [19]

Awaji et al.

[11] Patent Number: 5,676,230

[45] Date of Patent: Oct. 14, 1997

[54] BUSHING FOR ONE-WAY CLUTCH

[75] Inventors: Toshio Awaji; Takashi Miura; Taiji Kamiya, all of Shizuoka-ken, Japan

[73] Assignee: NSK-Warner K.K., Japan

[21] Appl. No.: 579,850

[22] Filed: Dec. 28, 1995

[30] Foreign Application Priority Data

Dec. 28, 1994 [JP] Japan ................... 6-341051

[51] Int. Cl.$^6$ ................... F16H 41/30; F16D 41/00
[52] U.S. Cl. ................... 192/110 B; 60/339; 60/345; 192/113.32; 192/113.5
[58] Field of Search ................... 192/113.32, 113.5, 192/110 B, 3.34; 384/606, 291, 292, 313, 368, 371; 60/345, 339

[56] References Cited

U.S. PATENT DOCUMENTS

| 2,081,063 | 5/1937 | Oliver | 384/368 |
|---|---|---|---|
| 3,175,661 | 3/1965 | Maurer et al. | |
| 3,399,007 | 8/1968 | Remmers et al. | 384/371 |
| 3,635,535 | 1/1972 | Schultenkamper | 384/371 |
| 4,027,932 | 6/1977 | Kunkel et al. | 384/606 |
| 4,191,279 | 3/1980 | Brown | 192/113.32 X |
| 4,961,486 | 10/1990 | Kinoshita et al. | |

FOREIGN PATENT DOCUMENTS

| 62-93452 | 6/1987 | Japan . |
|---|---|---|
| 63-11965 | 1/1988 | Japan . |

*Primary Examiner*—Rodney H. Bonck
*Attorney, Agent, or Firm*—Evenson, McKeown, Edwards & Lenahan P.L.L.C

[57] ABSTRACT

Disclosed herein is a bushing for a one-way clutch which is to be assembled in a stator of a torque converter. The bushing is useful for centering outer and inner rings of the one-way clutch and for backing up an associated thrust needle bearing. The bushing has a thrust surface to be positioned facing the thrust needle bearing and defines a center hole, an inner periphery and an outer periphery. The bushing is provided with a plurality of grooves formed in the thrust surface of the bushing and extending from the outer periphery to the inner periphery. An inward extension of a longitudinal center line of each of the grooves does not intersect a center of the bushing. The grooves may be arranged, for example, in the form of a whorl.

14 Claims, 5 Drawing Sheets

THRUST LOAD

THRUST LOAD

BUSHING FOR ONE-WAY CLUTCH

BACKGROUND OF THE INVENTION a) Field of the Invention

This invention relates to a bushing for a one-way clutch which is used for the prevention of reverse rotation in a torque converter for an automotive vehicle or the like.

b) Description of the Related Art

To facilitate understanding of the present invention, a cross-sectional view of one example of a torque converter is shown in FIG. 2. There are illustrated a plate 1 for transmitting rotation of an engine (not shown) to a torque converter 2, a pump impeller 3 of the torque converter 2, a turbine runner 4, a stator 5, an output shaft 6, a fixed shaft 7, an outer ring 8 and inner ring 9 of a one-way clutch 10, bushings 11,12, and thrust needle bearings 20,21. The bushings 11,12 are used as means for centering the inner and outer rings 8,9 and also as backups for the thrust needle bearings 20,21, respectively.

The stator 5 has been fabricated usually by die-casting an aluminum alloy or injection-molding a synthetic resin. The bushings 11,12 are generally made of an aluminum alloy, high-strength brass or the like.

FIG. 3 is a front view of a conventional bushing 11. Radial groves 11a are arranged in a thrust surface 11b at which the bushing 11 is maintained in contact with an associated thrust needle bearing. Designated at reference symbol 11d are inlet grooves for lubeoil.

FIG. 4A is a cross-sectional view taken in the direction of arrows IVA—IVA of FIG. 3 in which the thrust needle bearing 20 is in contact under a thrust with the thrust surface 11b. Letter O indicates a center of the bushing 11. Specifically, an inner race 24 of the thrust needle bearing 20 is in contact with the thrust surface 11b, and needles 23 are held in place between the inner race 24 and an outer race 22.

As is indicated by arrows, lubeoil enters the groove 11a through the inlet groove 11d so that lubeoil inside the torque converter circulates from a side of an inner periphery of the bushing to a side of an outer periphery of the bushing through the groove 11a as a flow passage. Further, the thrust surface 11b serves as a backup for the thrust needle bearing 20 and, when the stator 5 rotates, the needles 23 roll between the inner and outer races 22 and 24 of the thrust needle bearing 20.

FIG. 4B is an enlarged fragmentary side view as seen in the direction of arrow A in FIG. 4A. Keeping step with the tendency toward engines of higher output, it is now increasingly recognized that the stator 5 produces a high thrust load. The needles 23 which roll on the race 24 are therefore subjected to such a high thrust load. As the needles 23 are arranged so that their longitudinal central axes extend in the radial direction so that the needles 23 are positioned in parallel with the grooves 11a. This means that plural (five in FIG. 4B) needles 23 are positioned within the range of a width of each groove 11a. By the high thrust load mentioned above, the race 24 may collapse into the grooves 11a of the bushing 11. If this problem takes place, the needles 23 can no longer roll smoothly so that flaking is developed.

Further, small relative movements occur in an angular direction between the thrust surface 11b of the bushing 11 and the race 24. Because of the radial orientation of the grooves 11a in the bushing 11, the race 24 tends to collapse into the grooves 11a of the bushing 11 as described above. Then, the lubeoil existing in the form of a thin film between the thrust surface 11b and the race 24 may be scraped off by both side edges of each groove 11a, resulting in deformation and wearing of the thrust surface 11b of the bushing 11, especially centering at the side edges of each groove 11a.

SUMMARY OF THE INVENTION

An object of the present invention is therefore to provide a bushing for a one-way clutch, which is effective for the prevention of such collapse of a corresponding race of an associated thrust needle bearing.

As a result of an extensive investigation, the present inventors found that the above-mentioned object of the present invention can be achieved by forming each groove in direction somewhat inclined relative to its corresponding radial direction, leading to the completion of the present invention.

In one aspect of the present invention, there is thus provided a bushing for a one-way clutch to be assembled in a stator of a torque converter. The bushing is useful as means for centering outer and inner rings of the one-way clutch and also as a backup for an associated thrust needle bearing. The bushing has a thrust surface to be positioned facing the thrust needle bearing and defining a center hole, an inner periphery and an outer periphery. The bushing comprises a plurality of grooves formed in the thrust surface of the bushing and extending from the outer periphery to the inner periphery with an inward extension of a longitudinal center line of each of the grooves not intersecting a center of the bushing. The grooves may be arranged in the form of a whorl. A radial line, which connects the center of the bushing to a point of intersection between the longitudinal center line of each groove and the inner periphery, may form an angle greater than 15° but smaller than 90°, preferably in a range of 30° to 60°, notably of 45° with the inward extension of the longitudinal center line of the groove at the point of intersection.

As the bushing according to this invention is constructed as described above, a corresponding race of the associated thrust needle bearing does not collapse into the grooves formed in the thrust surface of the bushing even when a high thrust load is applied to the thrust needle bearing. Smooth rolling of the needles is therefore maintained.

It has heretofore been needed to take a special measure such as making the race thicker or subjecting needles to special heat treatment wherever there is the potential problem that flaking or the like of the needles may occur due to insufficient rolling of the needles. Such special measure unavoidably leads to a higher manufacturing cost. The bushing according to the present invention does not require such a special treatment so that the problem of the higher manufacturing cost has been successfully overcome.

DETAILED DESCRIPTION OF THE INVENTION AND PREFERRED EMBODIMENTS

Figure 1A:
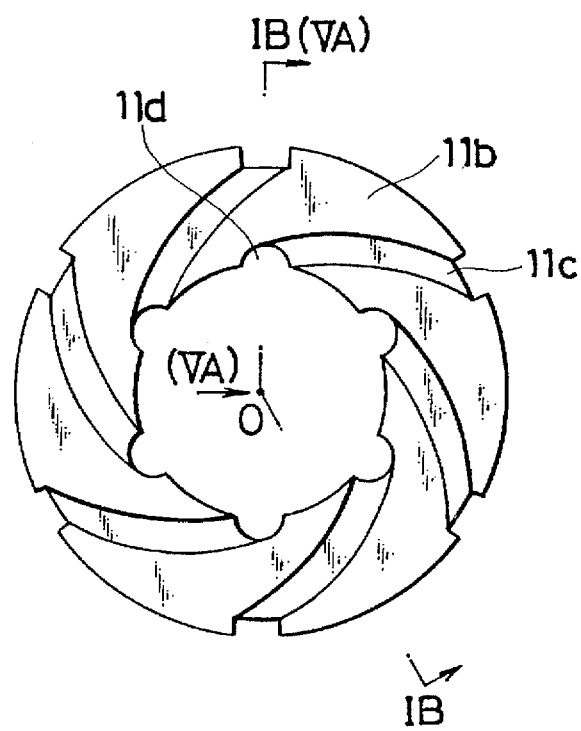
FIG. 1A is a front view of a bushing according to a first embodiment of the present invention.
Figure 1B:
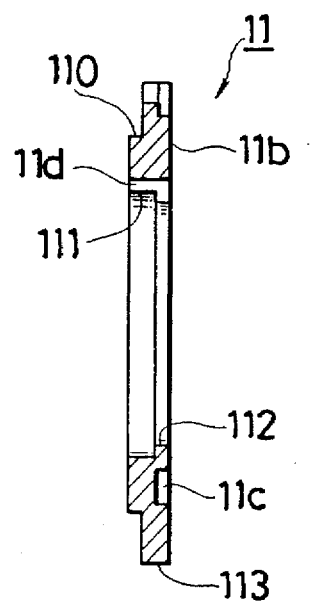
FIG. 1B is a cross-sectional view taken along the line IV-O-IV of FIG. 1A.
Figure 2:
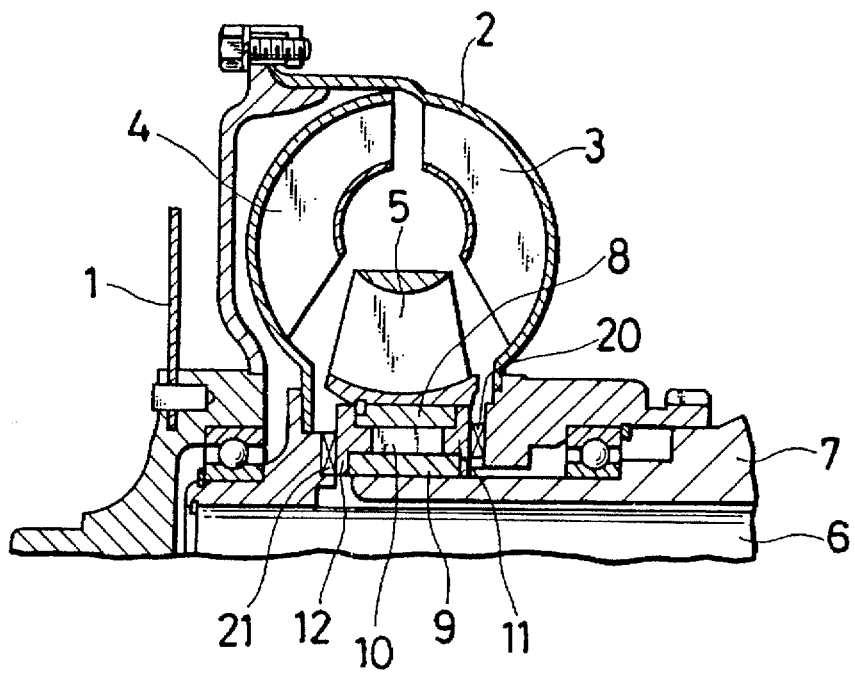
FIG. 2 is a fragmentary cross-sectional view illustrating the basic construction of a torque converter.
Figure 3:
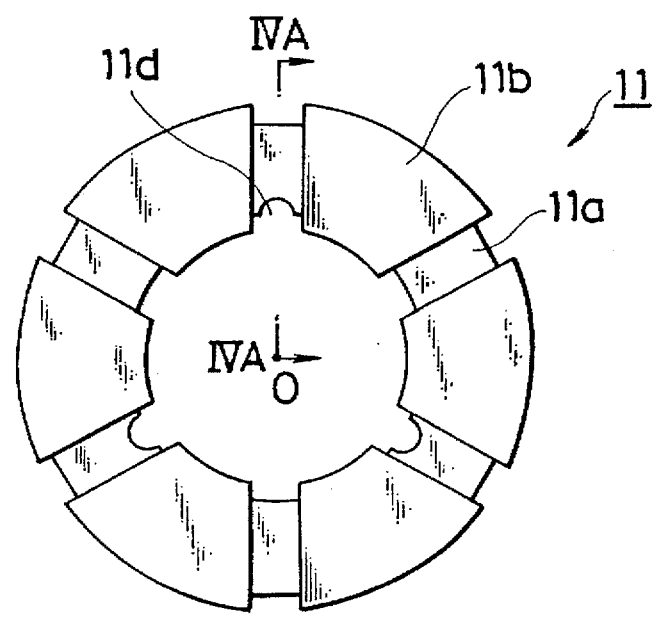
FIG. 3 is a front view of a conventional bushing.

Referring first to FIGS. 1A and 1B, the bushing according to the first embodiment of the present invention will be described. In these drawings, there are illustrated a thrust surface 11b to be arranged in contact under a thrust with an associated thrust needle bearing, grooves 11c arranged in the form of a whorl in the thrust surface 11b, lubeoil inlet grooves 11d, an outer ring guide portion 110, an inner ring guide portion 111, an inner periphery 112 and an outer periphery 113.

Lubeoil flows in through the inlet grooves 11d and flows out to a side of the outer periphery 113 through the grooves 11c arranged in the form of the whorl.

Figure 4A:
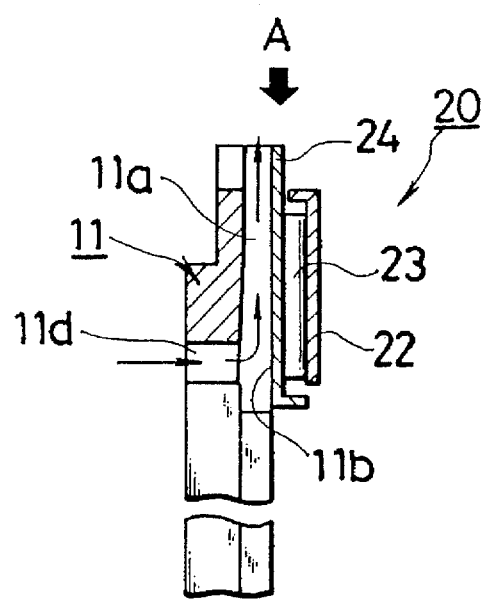
FIG. 4A is a cross-sectional view taken in the direction of arrows IVA—IVA of FIG. 3.
Figure 4B:
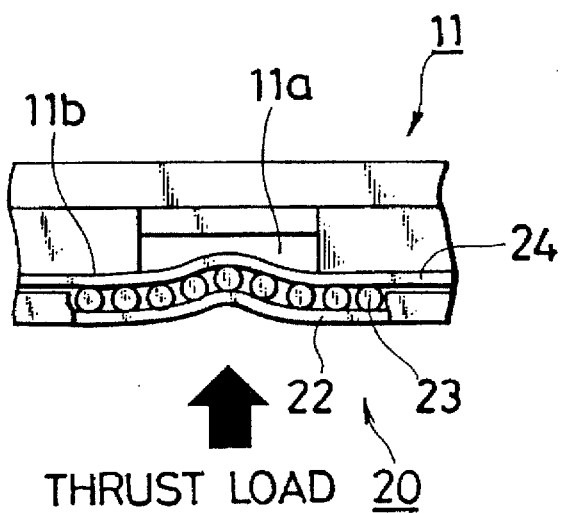
FIG. 4B is a side view of the conventional bushing as seen in the direction of arrow A.
Figure 5A:
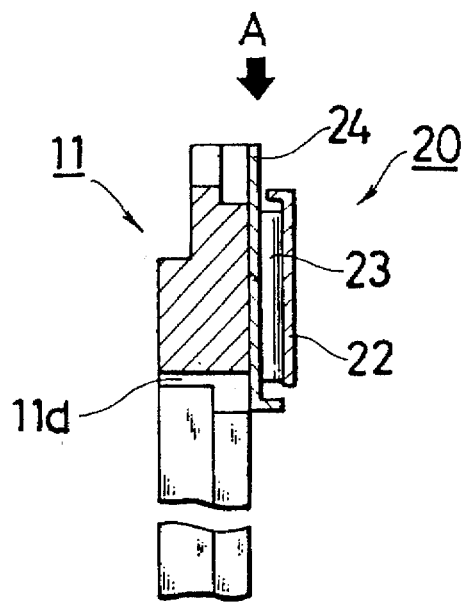
FIG. 5A is a cross-sectional view of the bushing according to the first embodiment of the present invention taken in the direction of arrows VA—VA of FIG. 1.
Figure 5B:
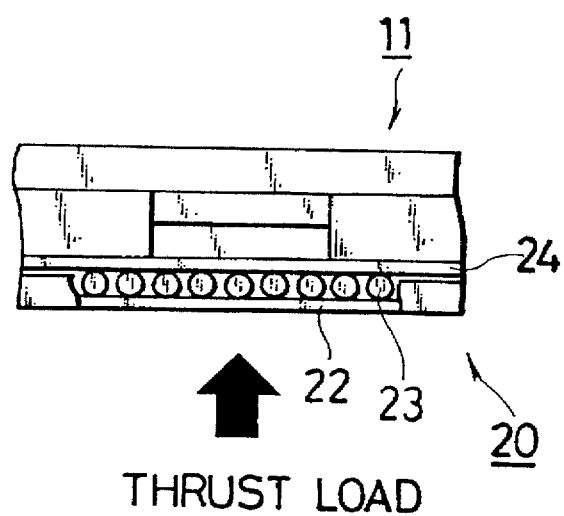
FIG. 5B is an enlarged fragmentary side view as seen in the direction of arrow A in FIG. 5A.

With reference to FIGS. 5A and 5B which correspond to FIGS. 4A and 4B of the above-described prior art bushing, respectively, a description will be made of the bushing 11 according to the first embodiment of the present invention when the thrust needle bearing 20 is brought into contact under a thrust with the thrust surface 11b.

In FIGS. 5A and 5B, numerals 22,24 indicate races of the thrust needle bearing 20 and numeral 23 designates needles. As the grooves 11c for the lubeoil are arranged in the form of the whorl in this embodiment, the grooves 11c are not in parallel with the needles 23 which are arranged in a radial pattern so that the grooves 11c and the needles 23 intersect each other. Even when a thrust load is applied, the corresponding race 23 and the needles 23 do not collapse into the grooves 11c.

Figure 6:
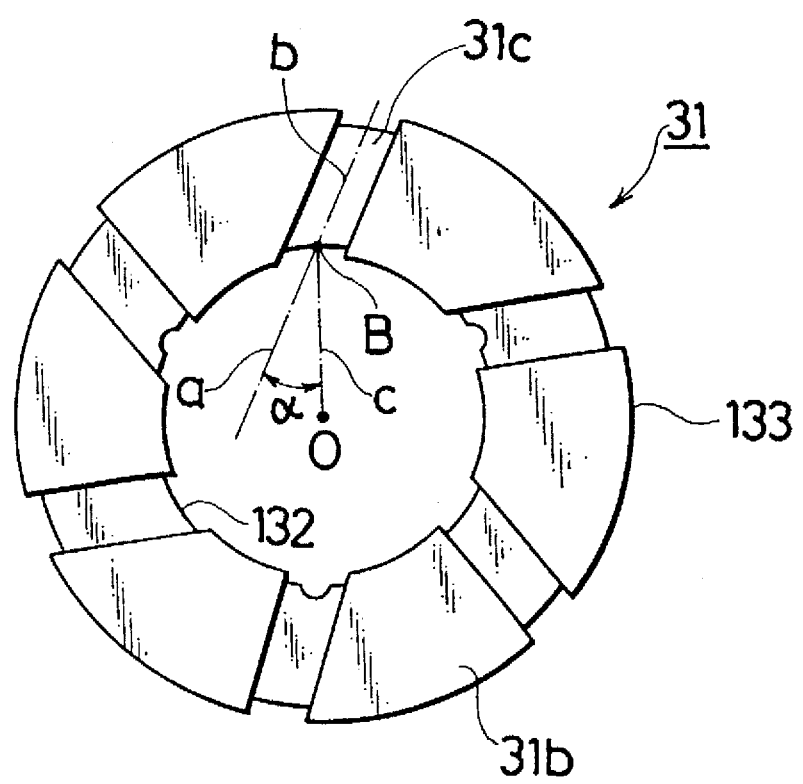
FIG. 6 is a front view of a bushing according to a second embodiment of the present invention.

Next, the bushing according to the second embodiment of the present invention will be described with reference to FIG. 6. In a thrust surface 31b of the bushing 31, plural grooves 31c are formed at equal angular intervals from an outer periphery 133 to an inner periphery 132 of the bushing 31. An inward extension a of a longitudinal central line b of each groove 31c does not intersect a center O of the bushing of the bushing 31, that is, of the inner periphery 132 and the outer periphery 133. A radial line c, which connects the center O of the bushing 31 to a point B of intersection between the longitudinal center line b of each groove 31c and the inner periphery 132, forms an angle α greater than 15° but smaller than 90°, preferably in a range of 30° to 60°, notably of 45° with the inward extension a of the longitudinal center line b of the groove 31c at the point B of intersection. The bushing 31 according to the second embodiment can bring about similar advantages as the above-described bushing 11 according to the first embodiment.

We claim:

1. A one-way clutch arrangement in a stator of a torque converter, comprising:
    a one-way clutch including an inner ring and an outer ring;
    a bushing arranged adjacent an axial edge of said inner and outer rings, said bushing having a thrust surface facing axially opposite said inner and outer rings; and
    a needle thrust bearing arranged in engagement with said thrust surface of said bushing,
    said bushing defining a center hole, an inner periphery, and an outer periphery, a plurality of grooves being formed in said thrust surface of said bushing and extending from said outer periphery to said inner periphery with an inward extension of a longitudinal center line of each of said grooves not intersecting a center of said bushing.

2. A one-way clutch arrangement according to claim 1, wherein said grooves are arranged in the form of a whorl.

3. A one-way clutch arrangement according to claim 1, wherein a radial line, which connects said center of said bushing to a point of intersection between said longitudinal center line of each groove and said inner periphery, forms an angle greater than 15° but smaller than 90° with said inward extension of said longitudinal center line of said groove at said point of intersection.

4. A one-way clutch arrangement according to claim 3, wherein said angle ranges from 30° to 60°.

5. A one-way clutch arrangement according to claim 3, wherein said angle is substantially 45°.

6. A one-way clutch arrangement according to claim 1, wherein said inner and outer rings, said bushing, and said needle thrust bearing are arranged coaxially with respect to an output shaft of the torque converter.

7. A one-way clutch arrangement according to claim 1, wherein said needle thrust bearing comprises an axially inner race, an axially outer race, and a plurality of needles arranged between said inner and outer races, each of said needles being oriented in a radial direction.

8. A one-way clutch arrangement according to claim 1, wherein said bushing centers said inner and outer rings.

9. A one-way clutch arrangement in a stator of a torque converter, comprising:
    a one-way clutch including an inner ring and an outer ring arranged between a stator of a torque converter and a fixed shaft of the torque converter, said inner and outer rings being arranged concentrically to each other and coaxially with respect to said fixed shaft;
    a bushing arranged adjacent an axial edge of said inner and outer rings and coaxially with respect to said fixed shaft, said bushing having a thrust surface facing axially opposite said inner and outer rings; and
    a needle thrust bearing arranged in engagement with said thrust surface of said bushing, said needle thrust bearing including an axially inner race, an axially outer race, and a plurality of needles arranged between said inner and outer races, each of said needles extending in a radial direction with respect to said fixed shaft, said axially inner and outer races being arranged coaxially with respect to said fixed shaft,
    said bushing defining a center hole, an inner periphery, and an outer periphery, a plurality of grooves being formed in said thrust surface of said bushing and extending from said outer periphery to said inner periphery obliquely to said radial direction of said needles such that said needles of said needle thrust bearing are always supported by said thrust surface.

10. A one-way clutch arrangement according to claim 9, wherein said grooves are arranged in the form of a whorl.

11. A one-way clutch arrangement according to claim 9, wherein an inward extension of a longitudinal center line of each of said grooves does not intersect a center of said bushing.

12. A one-way clutch arrangement according to claim 11, wherein a radial line, which connects said center of said bushing to a point of intersection between said longitudinal center line of each groove and said inner periphery, forms an angle greater than 15° but smaller than 90° with said inward extension of said longitudinal center line of said groove at said point of intersection.

13. A one-way clutch arrangement according to claim 12, wherein said angle ranges from 30° to 60°.

14. A one-way clutch arrangement according to claim 12, wherein said angle is substantially 45°.

* * * * *